Aug. 11, 1942.  J. T. WEBBER  2,292,680
THERMOHYDROMETER
Filed Dec. 11, 1939
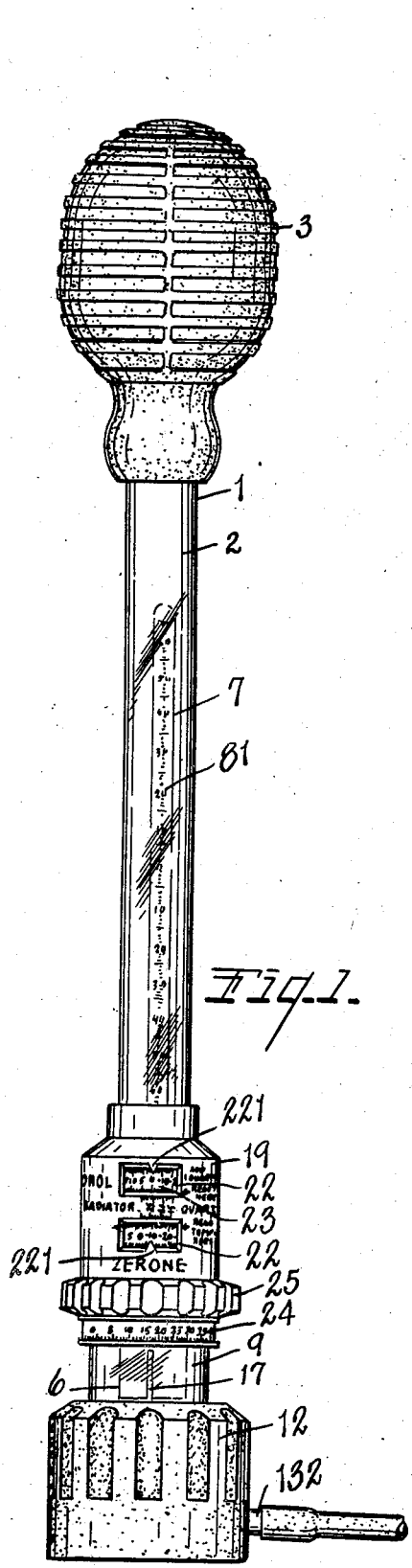
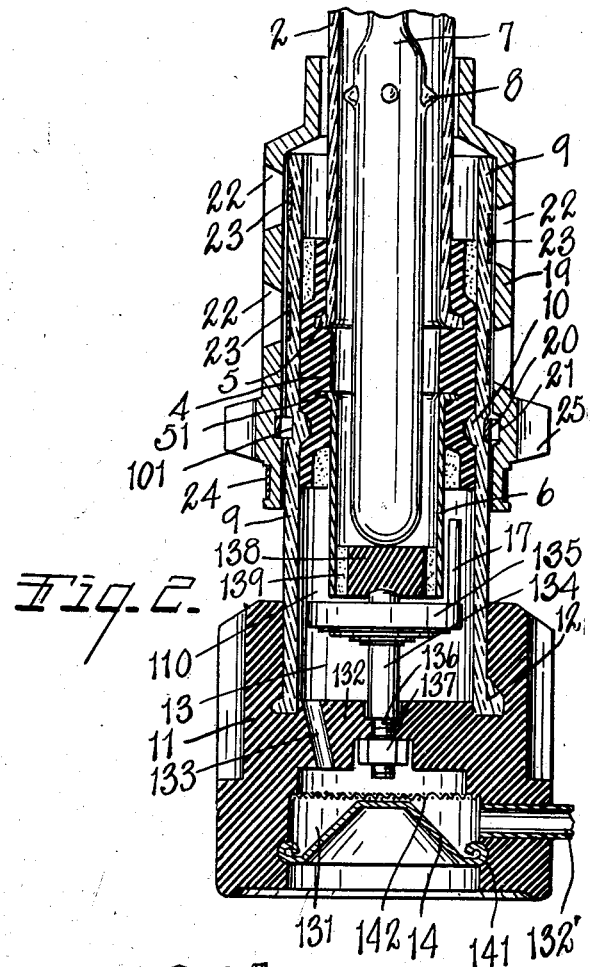
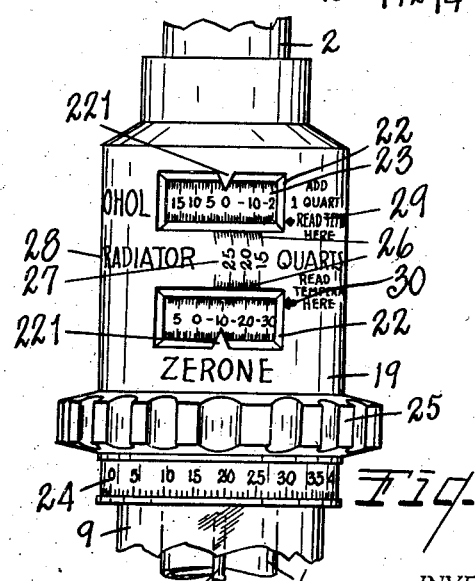
INVENTOR.
Joseph T. Webber
BY Earl D. Chappell
ATTORNEYS Patented Aug. 11, 1942

2,292,680

UNITED STATES PATENT OFFICE 2,292,680

THERMOHYDROMETER

Joseph T. Webber, Kalamazoo, Mich., assignor to Roscoe B. Lacey, Kalamazoo, Mich.

Application December 11, 1939, Serial No. 308,679

18 Claims. (Cl. 265—46)

This invention relates to improvements in thermohydrometers.

This is a continuation in part of my copending application Serial No. 273,661, filed May 15, 1939, and entitled Thermohydrometer.

This invention has for its objects:

First, to provide a testing device or instrument for ascertaining the specific gravity of a liquid, corrected for temperature.

Second, to provide an instrument of the type described whereby a final reading of specific gravity or freezing point of a liquid may be taken directly from the instrument without recourse to charts or tables and without requiring interpolation or other mental calculation on the part of the user.

Third, to provide an instrument or device of the type described which is extremely accurate in the readings which it provides due to elimination of errors arising from the above mentioned factors as well as errors which have hitherto arisen in similar devices by reason of the construction and arrangement of the parts thereof.

Fourth, to provide an instrument of the type described, in particular a device for determining the freezing point of liquids wherein the need for taking a separate reading of temperature in addition to a specific gravity reading is eliminated.

Fifth, to provide an instrument having novel means for preventing obscuring of a thermally responsive element included in the instrument whereby observation of the said element is facilitated.

Sixth, to provide a thermohydrometer having novel calculating means associated therewith whereby a direct reading of freezing point or corrected specific gravity may be readily had without recourse to mental calculation, charts, or tables.

Seventh, to provide a calculating device particularly adapted for association with a testing instrument and having means for ascertaining a temperature-corrected property such as specific gravity or freezing point of any of a plurality of liquids by a simple manipulation and whereby the corrected information for any of the liquids is available at a glance.

Eighth, to provide an instrument of the type described wherein the temperature-corrected specific gravity of the liquid tested may be quickly ascertained by directly reading suitable indicia on the instrument, and also in which it is possible to ascertain the freezing point for the liquid which will result (on the basis of a given volume of liquid) when a predetermined further quantity of anti-freeze substance is added thereto.

Ninth, to provide a calculating device of the type described, particularly in association with an instrument of the type described, whereby with a given quantity of anti-freeze solution the freezing point of which is known or has been ascertained, the freezing point resulting when a given further quantity of anti-freeze material is added thereto may be readily and quickly forecast.

Further objects relating to details and economies of my invention will definitely appear from the description to follow. The invention is defined in the claims.

A structure embodying the features of my invention is illustrated in the accompanying drawing, wherein:

Fig. 1 is a view in front elevation of a preferred embodiment of the device or instrument of my invention.

Fig. 2 is an enlarged fragmentary view in vertical section illustrating details of construction of the instrument.

Fig. 3 is a fragmentary view more clearly illustrating the construction of the calculating device of the instrument as embodied in Figs. 1 and 2.

This invention in general relates to hydrometers and in particular to devices for testing the freezing point of a liquid such as are designated by the term "thermohydrometers." These instruments are commonly used in the determination of the temperature-corrected freezing point of a liquid, an anti-freeze solution for automobile radiators, for example. At present, a determination of the correct freezing point of such a liquid involves the ascertainment of the specific gravity of the liquid at the temperature of the latter at which the test is made and also the ascertainment of that temperature. These two readings are then referred to a suitable chart or table in order to arrive at an approximation of the actual or corrected freezing point of the liquid. The float usually employed for determining the specific gravity is floated in a part of the liquid fed to the tester which is at quite a different temperature than that influencing the temperature ascertaining element of the instrument, with the result that when compared to the aforesaid chart the temperature relied on is not in fact that of the liquid on which the float reading is based. Moreover, the usual charts or tables supplied by manufacturers of the instruments for this purpose arbitrarily specify widely separated gradations in the temperature range, there being, for example, ten or twenty degrees' difference between temperatures printed on the charts, with the result that should the temperature fall between these steps and should anything approaching an accurate corrected reading be desired, the user is obliged to make various mental calculations involving interpolation of numbers, which he is in the large majority of cases incapable of making with any degree of reliability. The result is that even when the specific gravity and temperature readings truly represent the condition of the fluid, there is likely to be a substantial error, but when the float and thermometer are subjected to liquid at different temperatures, then the error is multiplied so that no reliance whatsoever can safely be placed thereon.

In the device of my invention, both of these sources of inaccuracy are eliminated, in that I provide that the float and thermally responsive element thereof are as nearly as possible subjected to liquid at the same temperature, and in that means are provided not only eliminating the need of taking a separate temperature reading, but also make it possible by a simple manipulation to read off directly the desired corrected freezing point or specific gravity without any recourse whatsover to mental calculation, charts, or tables.

My device further includes a thermally responsive element serving directly as a temperature indicator (there being no need for a temperature calibration or scale) with which are associated means for preventing obscuring of this indicator element by the dirty, cloudy, or rusty liquid usually tested, i. e., radiator anti-freeze liquid, so that ready observation of the position of the element is at all times possible.

Referring to the drawing, the reference numeral 1 in general indicates the preferred embodimnt of my invention in a thermohydrometer for testing anti-freeze solutions such as are used in the cooling systems of internal combustion engines. This instrument has a transparent barrel 2 to the upper open end of which is attached a rubber bulb 3 for creating a reduced pressure in the barrel and thereby drawing liquid to be tested into the same. Referring to Fig. 2, the barrel 2 has the lower open end thereof secured to a sleeve 4 of rubber, said barrel carrying a radial flange 5 at its lower open end to locate and vertically position the same in the sleeve. This sleeve also has secured thereto by means of a similar flange 51 a downwardly extending cylindrical or tubular member 6 projecting beyond the lowermost end of sleeve 4; the purpose of member 6 will be hereinafter referred to. The barrel 2, sleeve 4, and cylindrical element 6 constitute a continuous cylindrical open ended chamber wherein a hydrometer float 7 is disposed, this float being preferably provided with suitable projections 8 for maintaining the same properly spaced from the wall of the chamber and having calibrations 81 on an extension thereof to designate different positions of the float relative to the level of a liquid being tested.

On its exterior, the sleeve 4 has fixedly secured thereto a further cylindrical sleeve 9 of transparent material or glass, the two sleeves 4 and 9 being secured to each other by an annular indentation 10 on the latter, which indentation serves a further purpose to be referred to. It will be perceived that transparent sleeve 9, tubular extension member 6 and the rubber sleeve 4 coact to provide an annular chamber 110 surrounding member 6 and acting as an air lock or seal operating on the principle of the diving bell to prevent substantial rise of liquid in the chamber, regardless of the liquid level in barrel 2.

At its lower end, the sleeve 9 is fitted or embedded into a hollow rubber base or housing 11. I preferably provide a single projecting lug 12 on the said lower end of sleeve 9, which coacts with a similar recess in the housing 11 to enable the housing and sleeve to be positioned in a predetermined angular relation to one another. The hollow housing has a chamber 13 in free communication with chamber 110 and in fact constituting a continuation thereof. Chamber 13 is in turn in communication with a liquid inlet chamber 131 provided with an inlet fitting 132' adapted to receive a suitable hose or line for admitting the liquid to be tested.

The chambers 13, 131 communicate through the integral horizontal partition 132 of the base 11 by means of a passage 133 in the latter which is inclined upwardly and outwardly so that liquid passing through the same is directed to impinge against the inner surface of the transparent sleeve 9, thereby washing the same in a manner to remove mist or condensation which may have collected thereon.

In the present construction, I utilize a cupped metal disk 14 to close the chamber 131, this disk being provided with a peripheral bead 141 which engages in an annular groove formed in the wall of the chamber to receive the same. The disk 14 supports a suitable screen 142 in place in chamber 131.

The partition 132 referred to above is utilized to support a stem 134 upon the upper end of which a coiled bimetallic temperature responsive element 135 is carried, the inner end of the element being fixedly attached to the stem. At its lower end, stem 134 is threaded at 136 to extend through a central aperture in partition 132 and receives a nut 137 thereon to hold the same in place. A rubber plug 138 is inserted in the lower end of the sleeve 6, resting on the upper end of stem 134 and serving to support the float 7 when the barrel is empty. This plug is fluted around its exterior periphery at 139 to permit the passage of liquid therepast in filling the barrel.

It will be noted that in certain details of construction, primarily in the use of the inclined passage 133 for washing the inner wall of the chamber 13, the above described details differ somewhat from those shown in my aforesaid copending application Serial No. 273,661. I have found the same to present certain practical advantages from the standpoint of construction and ease of assembly to say nothing of the specifically mentioned feature of advantage of washing the wall of the viewing chamber.

At its free end, the thermally responsive bimetallic element 135 carries an upstanding indicating finger or pointer 17 which extends upwardly into the space between the exterior of cylindrical element 6 and the transparent glass sleeve 9, the pointer traveling in an arcuate path in this space as the temperature of fluid admitted to the instrument varies.

As pointed out above, the downwardly extending cylindrical element 6 provides an air lock or seal for the space between the same and the glass sleeve 9, effectively preventing the rise of liquid into this space and thereby preventing a view of the pointer 17 through the glass sleeve 9 from being obscured by the normally dirty or rusty radiator cooling liquid. It will be apparent that an absolutely liquid tight seal such as has been proposed for certain types of instruments employing a mercury thermometer would be impractical for an installation including a bimetallic thermally responsive element such as I employ.

The passage 133 freely communicates chamber 13 with chamber 131, incidentally washing the wall of the former to clear the same of condensation or deposited particles, but the rise of the level of liquid in the upper part of chamber 13, i. e., substantially past the lower end of sleeve 6, is prevented.

In my application Serial No. 273,661, I have illustrated and described an alternative form of temperature indicating element, namely, a suitable mercury column which may be embodied in the instrument in place of the bimetallic element 135, but I have not deemed it necessary to illustrate this alternative construction in the present application, since the features constituting the invention of the present case are not particularly tied up to any particular form of temperature indicating element.

The exterior of cylindrical element 6 is preferably painted or glazed in a light color so as to afford a satisfactory background for viewing the finger or pointer 17 and if desired the latter may also be given a flash coating of any metal or other material which will improve its visibility through the transparent sleeve 9. It will now be perceived that it was for the purpose of imparting the said readily visible coating or glaze to element 6 that I have in the preferred embodiment constructed the same as an element separate from the glass barrel 2. It may in some cases, however, be practical and desirable to utilize the barrel itself for this purpose and I realize that if projected downwardly to the position occupied by the cylindrical element 6 a glass tube might be frosted or sand blasted to afford the desired background for the pointer 17. Obviously, the sleeve 4 and sleeve-like tubular member 6 house the float 7 in the same manner as barrel 2, in fact constitute an extension of the barrel, so that the barrel and sleeves may for all practical purposes be regarded as a single float enclosing barrel. Accordingly, I intend such a construction to fall within the scope of my invention.

By the aforesaid construction, the uncorrected specific gravity of the liquid may be ascertained by observing the calibrated characters 81 on the float 7 provided for this purpose. Pointer 17 at the same time assumes a position corresponding exactly with the temperature for said reading due to the close adjacency of bimetallic element 135 and the float to one another in the path of the incoming stream of liquid. It should be noted that no particular temperature indicia are provided for coaction with the pointer, the need for such indicia being eliminated in my device by the structure which will now be described.

The glass sleeve 9 and the barrel 2 have rotatably mounted thereon a one-piece barrel-like calculating member 19 which is preferably of a suitably opaque, rigid though inexpensive material such as Bakelite or molded hard rubber. In order to rotatably support the same, I utilize a split annular, polygonally shaped wire spring element 20 which coacts with the annular groove 101 formed by the indentation 10 in sleeve 9 and also with a similar annular internal groove 21 while the sides thereof lie in and coact with groove 10. This element 20 may be readily compressed circumferentially to allow the barrel-like member 19 to be telescoped over sleeve 9 in operative relation, the wire element 20 then springing outwardly for frictional sliding engagement with the grooves as described above. This element is preferably of suitable stiffness to successfully resist inadvertent longitudinal or axial displacement of the member 19 once it is assembled in proper position, permitting the latter to be rotated as desired, however. In addition to holding it and guiding the calculating member on the instrument, the wire element 20 serves as a spring brake exerting a predetermined amount of friction on the member for maintaining the same in any position to which it is adjusted.

The calculating member 19 has a number of vertically spaced and appropriately labeled indicator windows 22 formed therein, each provided with a pointer nib 221. These indicator windows are respectively in vertical register with scales, calibrations, or calibrated bands 23 on the sleeve 9 and spaced vertically from one another in correspondence to the spacing of the windows 22. These scales are clearly illustrated in Fig. 3, being preferably applied to sleeve 9 by decalcomania or transfer process, although it is evident that they may be printed directly on the sleeve or printed on strips adhesively secured to the sleeve, or otherwise if desired. The scales in the illustrated embodiment are calibrated in freezing points of various different liquids for which my device is intended, for example, such commonly known agents as alcohol, "Zerone," "Prestone" (ethylene glycol), and glycerine. The calibration of these scales is non-uniform since the relation of specific gravity and temperature is non-linear, i. e., a liquid has a different increment of specific gravity for a given temperature increment in one part of the temperature range than its specific gravity increment for a temperature increment in another part of the temperature range. These values are readily and accurately computed or supplied by reference tables relating to temperature-corrected specific gravity, freezing point and the like. Of course, the freezing point is a function of the corrected specific gravity, hence obviously by calibrating float 7 directly in terms of uncorrected specific gravity, either letters or numerals, and the scales 23 in terms of corrected specific gravity it is possible to adapt my device for furnishing directly a reading of this information, thus extending the use thereof to the testing of many other liquids or liquid mixtures such as battery electrolytes, photographic developers and fixatives, and the like.

At a point adjacent its lowermost edge, the calculator member 19 carries a scale 24 calibrated similarly to the calibrations 81 on the hydrometer float 7. If the float is calibrated uniformly in terms representing uncorrected specific gravity and if the progress of the temperature indicating member 17 is linear with respect to temperature, then the scale 24 on the movable calculator member must be non-uniform by reason of the non-linear relationship between specific gravity and temperature. This non-linear relationship may be expressed in my instrument in any of several ways. For example, the float may be provided with non-uniform calibration intervals or the thermometer or temperature indicator might be given a non-linear movement (within the range of temperatures tested by my instrument the element 135 has a substantially linear response, but other similar bimetallic elements are available on the market which, due to the combinations of metals used therein, may be non-linear in their reaction to temperature changes within the range covered by a thermohydrometer of the type under consideration), or the movable scale may have non-uniform calibration intervals, or a combination of these three expedients might be employed. I have chosen the last named of the three expedients, namely, a non-uniform calibration of the movable calculator scale 24, but do not wish to be unduly limited in this respect.

If the calibrations on the float and calculating member are not deemed sufficiently fine, they may of course be further subdivided as desired (although I have not shown this, in order to simplify the drawing) so as to enable any desired accuracy in taking a reading thereon. The calibrations 24 are located on the calculating member at a point closely adjacent the finger of pointer 17 so as to be capable of being readily alined therewith by rotation of member 19.

In order to facilitate rotary adjustment of the calculating member 19, I contemplate knurling the same at 25.

In use, the bulb 3 is actuated to draw a suitable quantity of liquid to be tested into barrel 2, causing the float to assume a certain position therein. The position of the float relative to the liquid level is observed, noting the indicia 81, and the calculating member 19 is then rotated until the indicium corresponding to the liquid level is located immediately above the temperature indicating finger or pointer 17. All the necessary manipulation is now finished and the user simply observes through the appropriate window the freezing point of the liquid being tested. These is no need for any consultation of tables or charts or of highly undependable mental calculation. The exact freezing point is immediately ascertainable at a glance. Furthermore, the results are exceedingly reliable by reason of the fact that the temperature indicating element and float are brought into as close adjacency as possible, whereby they are subjected to approximately the same temperature.

Great inconvenience has heretofore existed in the testing of anti-freeze solutions for the reason that even assuming that the correct freezing point of the liquid in the radiator of an automobile has been ascertained and assuming that this freezing point is not sufficiently low to insure against destructive freezing of the solution, it has heretofore been impossible to conveniently or accurately determine the amount of added anti-freeze material necessary to be added to a radiator of given capacity in order to lower the freezing point of its contents to the desired extent. By interpolating certain charts, it is sometimes possible to get an approximation of this information, but in all cases the results are at best extremely unreliable and the customer is generally somewhat dissatisfied with the service which he has received.

My invention therefore contemplates the provision of suitable indicia, preferably directly on the calculating member 19, to constitute the same not only an element for enabling temperature-corrected specific gravity to be directly read from the instrument, but also one which furnishes at a glance the information as to exactly how much added anti-freeze material must be added to a radiator of given capacity in order to lower the freezing point of the radiator solution a predetermined desired amount. As herein disclosed, I provide a calculator device 19 for easily and quickly determining each of these questions and though it is illustrated in combination with a radiator anti-freeze testing device, it will be apparent that the concept of my present invention has distinct value in the testing of any liquid of which it is desired to obtain accurate information concerning the above noted subject matter, whether the liquid is one containing an adulterant, or whether it is a liquid or solution to which it is desired to add a further amount of a component part, or otherwise treat the same.

Referring to Fig. 3, I provide the calculating member 19 with a calibrated scale 26 immediately adjacent each of the windows 22 in a predetermined angular relation to the pointer 221 of the latter. These scales 26 represent the factor of capacity of the given radiator system or other vessel containing the solution whose freezing point is being tested, and certain divisions and subdivisions of each scale are identified by capacity-representing indicia 27 which may conveniently be disposed between the two scales 26 of two adjacent windows 22. Preferably, the calibration is in terms of quarts capacity, there being further information, imparting indicia 28 expressing this fact.

It should be understood that the calibrations of the respective scales 26 for two different liquids are not exactly similar nor is either thereof uniform, since, for example, in a radiator capacity of twenty quarts the addition of one quart of anti-freeze solution will effect a lowering of the freezing point a certain number of degrees, whereas in a radiator of, say, twenty-five quarts capacity the addition of a quart of anti-freeze will effect a somewhat smaller reduction in freezing point. Moreover, for two equal capacities the addition of a quart of one type anti-freeze material to one and a similar quantity of anti-freeze material to another will effect different reductions in the final freezing point of each. Hence, it should be understood that the scales 26 must each be properly calibrated with the foregoing facts in mind and positioned correctly with angular reference to the pointer on its corresponding window. These adjustments will be accurately performed in the application of the scales 26 and I have made no attempt to illustrate with great accuracy whatever small differences in spacing of the subdivisions of the scales or relation to the numerical indicia 27 actually exist. These discrepancies may be taken care of, for example, by inclining the division or subdivision lines of either or both of the scales 26, as will be apparent.

In addition to the foregoing scales and indicia, the calculating member 19 is provided with still further indicia 29 preferably including pointers 30 associated with the windows 22 and indicating the fact that for the addition of a given quantity of anti-freeze material, for example, one quart, to a radiator or other container of given capacity, the resultant freezing point of the liquid tested may be forecast by simply noting the division or subdivision on scale 26 corresponding to that capacity and the point of the freezing point scale 23 which is alined therewith when pointer 221 indicates the present or actual temperature-corrected specific gravity. In other words, my device first enables the temperature-corrected specific gravity to be read directly from the instrument (by noting the point on the scale 23 coincident with pointer 221, assuming that the calculating member 19 has been properly rotated with reference to the temperature indicating device 17). Following this, in order to determine how much lower the freezing point of the liquid tested (or, indeed, any liquid whose temperature-corrected freezing point or specific gravity is known) will be carried by the addition of a quart of anti-freeze material in a system of given capacity, it is only necessary, with the parts in this adjusted position, to note the subdivision on scale 26 expressing the said given capacity and the point on scale 23 which is vertically alined therewith. This last named point represents the value of freezing point which will exist after a quart of the anti-freeze agent has been added. Used in this manner, the device of my invention affords all of the information about the anti-freeze agent or solution which is desired and, moreover, this information is obtained without the necessity of several consultations of charts and the like or the unreliable interpolation of figures which such procedure inevitably involves. The results are accurate and are conveniently and quickly arrived at in the presence of the purchaser, so that he leaves the gas or service station totally satisfied in his own mind that his automobile is safeguarded against damage from freezing.

As herein illustrated, the device is one which is capable of testing a plurality of different types of anti-freeze solution, some of which are heavier and others lighter than water. It is perfectly evident that by decreasing the number of solutions tested the accuracy of the results obtainable may be increased, for the calibrations of the float 7 may be spread out over a greater length due to the decreased range of gravities which it need test and correspondingly the calibrations of the scales 23 and 24 may be spread out with resultant increased ease and accuracy of reading.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a thermohydrometer or like testing instrument including a barrel, means for drawing liquid to be tested into the same, and a calibrated float in the barrel for indicating uncorrected specific gravity of the liquid tested, and means for affording a direct reading of the freezing point corresponding to temperature-corrected specific gravity of the liquid, comprising a temperature-responsive element, means for mounting the same on the instrument to be subjected to liquid entering the barrel whereby said element assumes a position in accordance with the temperature of the liquid, means for viewing said element from the exterior of the instrument, a calculating device associated with the instrument and adapted to be movably positioned thereon in predetermined relation to said element, said device being calibrated in terms of specific gravity to enable the device to be so positioned on the instrument by reference to the uncorrected specific gravity indicated by said float, and a scale on said instrument calibrated in terms of freezing point, said scale being positioned on the instrument adjacent said device and coacting therewith to afford a temperature-corrected reading of the freezing point of the liquid being tested, said device having further indicia thereon calibrated in terms of capacities of the liquid and coacting with said scale in a manner similar to the above coaction of the scale with the device to afford an indication of the freezing point of a given capacity of the liquid which will result from the addition of a predetermined quantity of anti-freeze material thereto.

2. In a thermohydrometer or like testing instrument including means for ascertaining the uncorrected specific gravity of a liquid tested, and means for affording a direct reading of the freezing point corresponding to temperature-corrected specific gravity of the liquid, comprising temperature indicating means, a calculating device associated with the instrument and adapted to be movably positioned thereon in predetermined relation to said temperature indicating means, said device being calibrated in terms of specific gravity to enable the device to be positioned on the instrument by reference to the uncorrected specific gravity of the liquid ascertained by said first named means, and a scale on said instrument calibrated in terms of freezing point, said scale being positioned on the instrument adjacent said device and coacting therewith to afford a temperature-corrected reading of the freezing point of the liquid being tested, said device having further means coacting with said scale in a manner similar to the above coaction of the scale with the device to afford an indication of the freezing point of a given capacity of the liquid which will result from the addition of a predetermined quantity of anti-freeze material thereto.

3. In a thermohydrometer or like testing instrument including means for ascertaining the uncorrected specific gravity of a liquid tested, and means for affording a direct reading of the freezing point corresponding to temperature-corrected specific gravity of the liquid, comprising a temperature-responsive element, means for mounting the same on the instrument to be subjected to liquid entering the barrel whereby said element assumes a position in accordance with the temperature of the liquid, a calculating device associated with the instrument and adapted to be movably positioned thereon with reference to said element, said device being calibrated in terms of specific gravity to enable the device to be predeterminedly positioned on the instrument by reference to the uncorrected specific gravity of the liquid as indicated by said first named means, and a scale on said instrument calibrated in terms of freezing point, said scale being positioned on the instrument adjacent said device and coacting therewith to afford a temperature-corrected reading of the freezing point of the liquid being tested, said device having further indicia thereon calibrated in terms of capacities of the liquid and coacting with said scale in a manner similar to the above coaction of the scale with the device to afford an indication of the freezing point of a given capacity of the liquid which will result from the addition of a predetermined quantity of anti-freeze material thereto.

4. A device of the type described including a liquid containing support, and means thereon for affording a direct reading of the freezing point corresponding to temperature-corrected specific gravity of the liquid, comprising temperature indicating means subject to liquid entering the support, a calculating member associated with said support and adapted to be movably positioned thereon with predetermined reference to said temperature indicating means, said member being calibrated in terms of specific gravity to enable the device to be predeterminedly positioned relative to said temperature indicating means by reference to the uncorrected specific gravity of the liquid tested, and a scale on said device calibrated in terms of freezing point, said scale being positioned on the device adjacent said member and coacting therewith to afford a temperature-corrected reading of the freezing point of the liquid, said member having further indicia thereon calibrated in terms of capacities of the liquid and coacting with said scale in a manner similar to the above coaction of the scale with the device to afford an indication of the freezing point of a given capacity of the liquid which will result from the addition of a predetermined quantity of anti-freeze material thereto.

5. In an instrument for ascertaining a thermal attribute or other attribute dependent on the temperature-corrected specific gravity of a solution, including a barrel adapted to have a quantity of the solution admitted thereto, a temperature indicating member associated with said barrel and subjected to liquid entering the same, means in said barrel for determining the uncorrected specific gravity of the solution, and a calculating device adjustably mounted on said barrel and having indicia calibrated in terms corresponding to specific gravity adapted to be predeterminedly positioned relative to said temperature indicating member by reference to the uncorrected specific gravity determined by said means, said barrel having a temperature scale thereon adjacent said device and coacting therewith whereby the temperature-corrected attribute of the solution may be ascertained when the calculating device is properly positioned, said calculating device having further indicia thereon coacting with said scale in a manner similar to the above coaction of the scale with the device to indicate quantitatively the effect on said attribute resulting from the treatment of the solution in a predetermined manner.

6. In an instrument for ascertaining a thermal attribute or other attribute dependent on the temperature-corrected specific gravity of a solution containing an anti-freeze agent, including an open ended barrel adapted to have a quantity of the solution admitted thereto, a chamber member transparent at least in part and fixedly associated with said barrel, a base associated with said member to constitute an intake chamber, said barrel and member constituting parts of an air seal chamber disposed above and communicating with said intake chamber, a thermally responsive member mounted on said base, said thermally responsive member having a portion disposed in said intake chamber and an indicating portion extending into said air seal chamber, a further chamber in said base separated from said intake chamber by a partition, said partition having an inclined passage therein for directing solution drawn therethrough from said further chamber against the inner wall of said chamber member to thereby remove condensation and/or particles deposited thereon and facilitate observation of said indicating portion in said air seal chamber, means in said barrel for determining the uncorrected specific gravity of the solution, and a calculating device rotatably mounted on said instrument and having indicia calibrated in terms of specific gravity adapted to be positioned relative to said temperature indicating portion in said air seal chamber, said instrument having a scale of freezing points thereon whereby the temperature-corrected freezing point of the solution may be ascertained when the calculating device is properly positioned.

7. A thermohydrometer for ascertaining a thermal attribute corresponding to the temperature-corrected specific gravity of a liquid or solution, comprising an open ended barrel adapted to have a quantity of the solution admitted thereto, a sleeve transparent at least in part and fixedly associated with said barrel in spaced concentric relation thereto, a base associated with the lower end of said sleeve to constitute a chamber, said concentric barrel and sleeve constituting an air seal chamber disposed above and communicating with said first-named chamber, a thermally responsive device mounted in said first-named chamber and having indicating means extending into said air seal chamber, said base having intake means for said first-named chamber including an inclined passage for directing solution drawn therethrough to impinge against the inner wall of said sleeve to thereby remove condensation and/or particles deposited thereon, means in said barrel for determining uncorrected specific gravity of the solution, and a calculating device adjustably mounted on said sleeve and having indicia calibrated in terms of specific gravity adapted to be positioned relative to said indicating means, said sleeve having a temperature scale thereon whereby the temperature-corrected thermal attribute of the solution may be ascertained when the calculating device is properly positioned, said calculating device having further indicia thereon calibrated in terms of predetermined volumes of the solution and coacting with said scale to indicate a thermal characteristic of the solution resulting from the addition to a given volume of the solution of a predetermined quantity of a component thereof.

8. A thermohydrometer for ascertaining a thermal attribute corresponding to the temperature-corrected specific gravity of a liquid or solution, comprising an open ended barrel adapted to have a quantity of the solution admitted thereto, a sleeve transparent at least in part and fixedly associated with said barrel in spaced concentric relation thereto, a base associated with the lower end of said sleeve to constitute a chamber, said concentric barrel and sleeve constituting an air seal chamber disposed above and communicating with said first named chamber, a thermally responsive device mounted in said first-named chamber and having indicating means extending into said air seal chamber, said base having intake means for said first-named chamber including a passage positioned to direct solution drawn therethrough to impinge against the inner wall of said sleeve to thereby remove condensation and/or particles deposited thereon, means in said barrel for determining uncorrected specific gravity of the solution, and a calculating device adjustably mounted on said sleeve and having indicia calibrated in terms of specific gravity adapted to be positioned relative to said indicating means, said sleeve having a temperature scale thereon whereby the temperature-corrected thermal attribute of the solution may be ascertained when the calculating device is properly positioned.

9. A solution testing instrument of the type described comprising an open ended barrel adapted to have a quantity of the solution admitted thereto, a sleeve transparent at least in part and fixedly associated with said barrel in spaced concentric relation thereto, a base associated with the lower end of said sleeve to constitute a chamber, said concentric barrel and sleeve constituting air seal chamber disposed above and communicating with said chamber, and a thermally responsive device mounted in said first-named chamber and having indicating means extending into said air seal chamber, said base having intake means including a passage positioned to direct solution drawn therethrough to impinge against the inner wall of said sleeve to thereby remove condensation and/or particles deposited thereon.

10. An instrument for testing liquids, comprising a receptacle adapted to have the liquid admitted thereto, a member transparent at least in part fixedly associated with said receptacle externally thereof and in longitudinal overlapping, laterally spaced relation thereto, a base associated with said member to constitute a chamber adjacent the receptacle, said member and the portion of the receptacle overlapped thereby constituting parts of an air seal chamber disposed above and communicating with said chamber, a coiled bimetallic element mounted on said base, said element being disposed in said first-named chamber and having an indicating pointer in said air seal chamber, said base having an intake, a passage therein communicating with said first-named chamber for directing liquid to impinge against the transparent portion of said member of the air seal chamber and thereby remove condensation and particles deposited thereon to facilitate viewing of said indicating pointer.

11. An instrument for testing liquids, comprising a receptacle adapted to have the liquid admitted thereto, a member transparent at least in part fixedly associated with said receptacle externally thereof and in longitudinal overlapping, laterally spaced relation thereto, a base associated with said member to constitute a chamber adjacent the receptacle, said member and the portion of the receptacle overlapped thereby constituting parts of an air seal chamber disposed above and communicating with said chamber, a thermally responsive device on said instrument having indicating means in said air seal chamber, said base having an inclined passage therein communicating with said first-named chamber for directing liquid to impinge against the transparent portion of said member of the air seal chamber and thereby remove condensation and particles deposited thereon to facilitate viewing of said indicating means.

12. In combination with a device for testing liquids on the basis of the specific gravity thereof having a liquid receiving container, means in the container for ascertaining an attribute of the liquid admitted thereto which is dependent on the specific gravity of the liquid, and means for ascertaining and indicating the temperature of the liquid admitted to the container, a calculator comprising a scale on the container calibrated in terms expressive of said attribute, and a calculating member adjustable on the container into predetermined position relative to said temperature indicating means, the positioning of said member relative to said last named means being effected by reference to the specific gravity ascertained by the specific gravity ascertaining means, said member having means thereon coacting with said scale in the adjusted position of the member to afford information relating to said attribute in the existing composition of the liquid, and having further means coacting with said scale to afford information relating to said attribute on the basis of a predetermined further treatment of the liquid.

13. In combination with a device for testing liquids on the basis of the specific gravity thereof having a liquid receiving container, means in the container for ascertaining the specific gravity of the liquid admitted thereto, and means for ascertaining and indicating the temperature of the liquid admitted to the container, a calculator comprising a scale on the container calibrated in terms of freezing point, and a calculating member adjustable on the container into a predetermined position relative to said temperature indicating means, the positioning of said member relative to said last named means being effected by reference to the specific gravity ascertained by the specific gravity ascertaining means, said member having means thereon coacting with said scale in the adjusted position of the member to afford information relating to the freezing point in the existing composition of the liquid, and having further means coacting with said scale to afford information relating to the freezing point on the basis of a predetermined further treatment of the liquid.

14. In combination with a device for testing liquids to determine an attribute thereof based on specific gravity, said device having means for ascertaining the specific gravity and temperature of the liquid, a calculator comprising a scale on the device calibrated in terms expressive of said attribute, a calculating member adjustably mounted on the device and positionable thereon in predetermined relation to said scale by reference to said specific gravity and temperature indicating means, said member having means thereon coacting with said scale to afford information relating to said attribute for the existing composition of the liquid and having further means thereon cooperating with said scale to afford information relating to said attribute based on a predetermined further treatment of the liquid.

15. In combination with a liquid testing instrument having means for ascertaining the specific gravity of a liquid tested and means for ascertaining and indicating the temperature of the liquid, a calculator comprising a scale on the instrument calibrated in terms of temperature, and a calculating device adjustably associated with the instrument and having means coacting with said temperature indicating means to enable the device to be positioned on the instrument in operative relation to said scale, said last named means being coactively located relative to said temperature indicating means by reference to the specific gravity ascertained by said first named means, said scale being disposed on the instrument adjacent said device and cooperating therewith to afford a reading of the freezing point of the liquid being tested, said device having further means coacting with said scale to afford an indication thereon of the freezing point of a given capacity of the liquid which will result from the addition of a predetermined quantity of anti-freeze material thereto.

16. In combination with a liquid testing instrument having means for ascertaining the specific gravity of a liquid tested and means for ascertaining and indicating the temperature of the liquid, a calculator comprising a calibrated scale on said instrument and a calculating device adjustably associated with the instrument having means coacting with the temperature indicating means to position the device in operative relation to said scale, said last named means being coactively located relative to the temperature indicating means by reference to the specific gravity ascertained by said first named means, said scale being disposed on the instrument adjacent said device and cooperating therewith to afford a reading of an attribute of the liquid being tested, said device having further means coacting with said scale to afford information relating to said attribute following further treatment thereof.

17. A calculator for ascertaining a characteristic of a given quantity of liquid dependent upon its specific gravity comprising a support, a scale on said support calibrated in terms expressive of said characteristic, and a calculator adjustably mounted on said support for coaction with said scale, said calculator having specific gravity indicia thereon and being predeterminedly positioned on said support by reference to the specific gravity of the liquid, using said indicia, and having means thereon coacting with said scale to afford information relating to said characteristic of the liquid, said calculator having calibration thereon in terms of given quantities of said liquid, said calibrations coacting with said scale in a manner similar to the coaction of said means therewith to afford an indication of the effect on said characteristic of a given quantity of said liquid resulting from a given treatment of said quantity thereof.

18. A calculator for ascertaining a characteristic of a given quantity of liquid dependent upon its specific gravity comprising a support, a scale on said support calibrated in terms expressive of said characteristic, and a calculator adjustably mounted on said support for coaction with said scale, said calculator being predeterminedly positioned on said support and having means thereon coacting with said scale to afford information relating to said characteristic of the liquid, said calculator having calibrations thereon in terms of given quantities of said liquid, said calibrations coacting with said scale in a manner similar to the coaction of said means therewith to afford an indication of the effect of said characteristic of a given quantity of said liquid resulting from a given treatment of said quantity thereof.

JOSEPH T. WEBBER.